United States Patent
Markevitch

(10) Patent No.: US 12,290,151 B2
(45) Date of Patent: May 6, 2025

(54) DEVICE FOR ASSISTING WITH TYING LACES

(71) Applicant: Roxane Markevitch, Carouge (CH)

(72) Inventor: Roxane Markevitch, Carouge (CH)

( * ) Notice: Subject to any disclaimer, the term of this patent is extended or adjusted under 35 U.S.C. 154(b) by 0 days.

(21) Appl. No.: 17/768,068

(22) PCT Filed: Oct. 10, 2020

(86) PCT No.: PCT/EP2020/078523
§ 371 (c)(1),
(2) Date: Apr. 11, 2022

(87) PCT Pub. No.: WO2021/069730
PCT Pub. Date: Apr. 15, 2021

(65) Prior Publication Data
US 2024/0090624 A1  Mar. 21, 2024

(30) Foreign Application Priority Data

Oct. 11, 2019 (EP) ...................................... 19202785

(51) Int. Cl.
*A43C 7/00* (2006.01)
*G09B 19/00* (2006.01)

(52) U.S. Cl.
CPC ............ *A43C 7/00* (2013.01); *G09B 19/0076* (2013.01)

(58) Field of Classification Search
CPC ........ A43C 7/00; A43C 7/08; G09B 19/0076; A44C 11/24; Y10T 24/3703; Y10T 24/3724; Y10T 24/3713
See application file for complete search history.

(56) References Cited

U.S. PATENT DOCUMENTS

| | | | | |
|---|---|---|---|---|
| 4,290,172 A | * | 9/1981 | Burton | A43C 7/00 24/712.2 |
| 4,342,557 A | | 8/1982 | Bandar | |
| 5,119,539 A | * | 6/1992 | Curry | A43C 7/00 24/712.9 |
| 6,066,160 A | * | 5/2000 | Colvin | A61B 17/0487 606/232 |
| 9,265,498 B2 | * | 2/2016 | Fallin | A61B 17/0487 |
| 2014/0115842 A1 | | 5/2014 | Sloan | |
| 2014/0137432 A1 | * | 5/2014 | Eldem | A43C 11/1493 24/713 |
| 2015/0173459 A1 | * | 6/2015 | Yang | A43C 7/00 24/713.2 |
| 2016/0219984 A1 | | 8/2016 | Chamberlain | |
| 2021/0030118 A1 | * | 2/2021 | Bartoo | A43C 7/00 |

FOREIGN PATENT DOCUMENTS

GB        1457313 A   * 11/1976   ............... A43C 7/00

* cited by examiner

*Primary Examiner* — Jack W Lavinder
(74) *Attorney, Agent, or Firm* — Weston R. Gould; Dinsmore & Shohl LLP

(57) ABSTRACT

The invention relates to a device for assisting with tying laces, comprising a first element having at least two pairs of holes, the holes of each pair being connected by a slot, and characterized in that each pair of holes of the first element comprises a first hole with a size adapted to let a lace be displaced therein, and a second hole with a size adapted to block any displacement of said lace.

12 Claims, 2 Drawing Sheets

DEVICE FOR ASSISTING WITH TYING LACES

TECHNICAL FIELD OF THE INVENTION

The present invention relates to a rope holding device and more specifically to a device for assisting with tying laces and to a method of use thereof.

STATE OF THE ART

Since the creation of laced shoes, tying these has often, if not always, been a major step in the life of a child, a teenager or even a young adult.

While one day we forget how much this step has been a real source of pride when we passed it, it is enough to see your children go through this ordeal to quickly remember it.

The process of tying the laces of a shoe needs some time to get used to and often requires a few minutes for the child to succeed or fail, and at that moment the accompanying adult helps him. While in a family context this might be anecdotal given the small number of children per family, it is quite different in a school context where the teacher should help more than twenty children.

Hence, it is necessary to develop a tool enabling the child to accelerate the learning of tying shoe laces while preserving a playful, and why not fashionable, aspect.

In general, shoe tying comprises two distinct steps. The first one consists in making a simple knot with the two laces and tightening the shoe. The second one consists in forming two loops with which a second simple knot is formed. The major difficulty for the child is to simultaneously form the two loops and tie them while keeping the shoe tight.

Hence, an object of the present invention is to solve the above-described problems, and more particularly to provide a device and a method allowing easily carrying out all the steps of tying shoe laces successively.

OBJECT OF THE INVENTION

To this end, a first aspect of the present invention relates to a device for assisting with tying laces comprising a first element having at least two pairs of holes, the holes of each pair being connected by a slot, and characterized in that each pair of holes of the first element comprises a first hole with a size adapted to let a lace pass therein and a second hole with a size adapted to block any displacement of said lace. Thus, it is possible to easily block the laces in the second holes.

Advantageously, the device comprises a second element having at least two pairs of holes and arranged so as to be superimposed on the first element, and each pair of holes of the second element comprises a first hole adapted to let said lace pass in a first direction and a second hole adapted to let said lace pass in a second direction opposite to the first direction so that said lace could form a loop on the device.

According to a preferred embodiment, the first and second elements are curved or straight planar elements. Thus, they can easily conform to several types of supports.

Advantageously, the first and second elements are made of a material from the group including at least one amongst a metal, whether precious or not, a rigid, semi-rigid or flexible polymer, an organic compound, a ceramic material or the like.

Advantageously, the first holes of the first element and the holes of the second element have a diameter comprised within the range from 3 mm to 8 mm, preferably 4 mm to 5 mm, ideally 4.5 mm. In this manner, the lace easily passes through the first holes.

According to a preferred embodiment, the second holes of the first element have a diameter comprised within the range from 0.5 mm to 5 mm, preferably 2 mm to 3 mm, ideally 2.5 mm. Hence, this embodiment allows blocking a lace easily in the second holes.

Advantageously, at least one amongst the first and second elements has a size comprised between 2 and 10 cm in length, 2 and 5 cm in width and 1 and 5 mm in thickness. Thus, they could be easily disposed on a shoe.

Preferably, the slots connecting the first and second holes of the first element have a length comprised between 1 mm and 1 cm and a thickness comprised between 0.5 and 5 mm. In this manner, the slot allows several types of laces to pass from a hole where it is free to a hole where it is blocked.

According to a preferred embodiment, the thickness of the slot decreases along its length between the first hole and the second hole. Hence, this embodiment allows blocking the lace easily in the first element.

Advantageously, when the two elements are arranged so that when they are disposed one on top of the other, the first holes of the first element face the first holes of the second element. Thus, the two elements could be superimposed exactly on top of each other.

Preferably, the holes of the second element are aligned one next to the other according to a straight line. Thus, the holes of the two elements could easily be superimposed exactly on each other.

According to a second aspect, the present invention relates to a method for assisting with tying shoes comprising a use of the device for assisting with tying shoes according to any of claims 2 to 11, comprising the following steps: applying the first element on the shoe so as to make the laces pass through the first holes of the first element transversely with respect to the first element, once the laces are tightened, displace the laces from the first holes to the second holes parallel to the plane of the first element, via the respective slots so as to block the laces in the tight position, applying the second element on the first element so as to make the laces pass through first holes in a first direction from the bottom upwards, then make the laces pass through the second hole in a second direction opposite to the first direction so that said lace could form a loop above the device. The aims, advantages and particular features of the system object of the present invention being similar to those of the pillow object of the present invention, they are not repeated herein.

Preferably, the movement of the laces relative to the first element is a two-step movement, firstly transverse with respect to the plane of the first element when they pass through the hole and then parallel when they slip into the slots. In this manner, it is possible to tie the laces through two distinct movements that are easy to understand.

BRIEF DESCRIPTION OF THE FIGURES

Other advantages, aims and particular features of the invention will come out from the following non-limiting description of at least one particular embodiment of the device and of the method object of the present invention, with reference to the appended drawings, wherein.

DETAILED DESCRIPTION OF THE INVENTION

The present description is provided on a non-limiting basis, each feature of an embodiment could advantageously be combined with any other feature of any other embodiment.

As of now, it should be noted that the figures are not to scale.

The invention relates to a device for assisting with tying laces comprising a first element having at least two pairs of holes, the holes of each pair being connected by a slot, and characterized in that each pair of holes of the first element comprises a first hole with a size adapted to let a lace be displaced therein and a second hole with a size adapted to block any displacement of said lace. Thus, it is possible to block the laces in the second holes easily.

Thus, the user makes his laces pass through the first holes, displaces them along the slot and blocks them in the second holes so as to keep the laces pulled. The free end could be used according to the user by making a knot or other, such as with the use of a second plate.

It should be noted that the first element may include other types of elements such as indentations, slots on the sides, etc.

Advantageously, the device comprises a second element having at least two pairs of holes and arranged so as to be superimposed on the first element, and each pair of holes of the second element comprises a first hole adapted to let said lace pass in a first direction and a second hole adapted to let said lace pass in a second direction opposite to the first direction so that said lace could form a loop on the device.

Figure 1A:
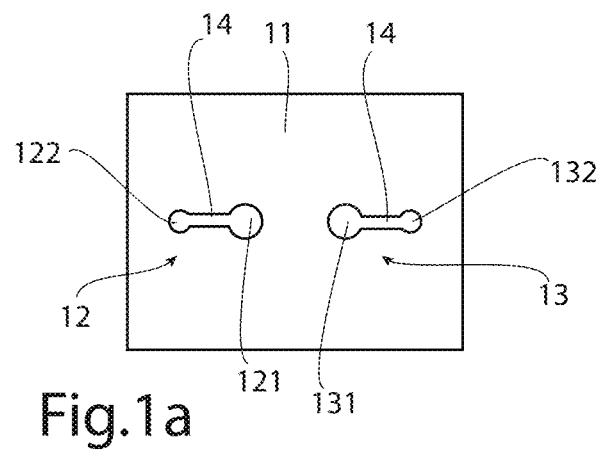
FIGS. 1a, 1b and 1c represent, schematically and in section, an embodiment of the first element of the device and two embodiments of the second element of the device of the present invention, respectively.
Figure 1B:
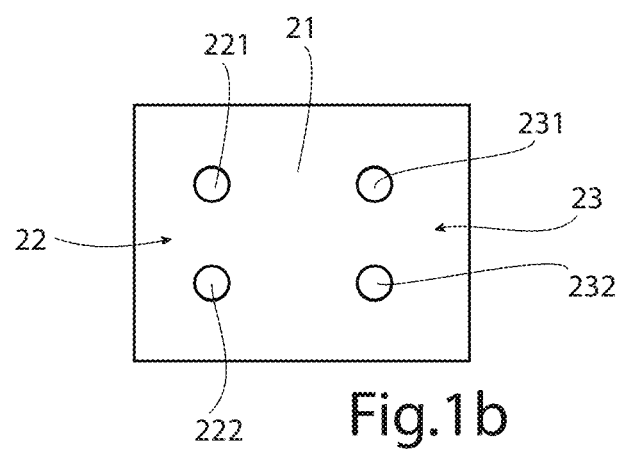
Figure 1C:
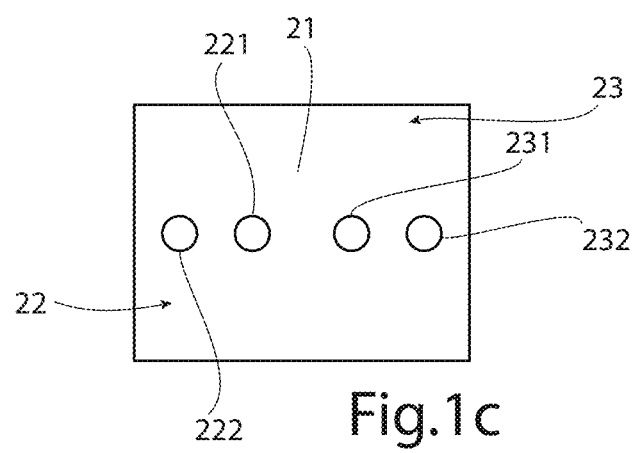
Figure 2A:
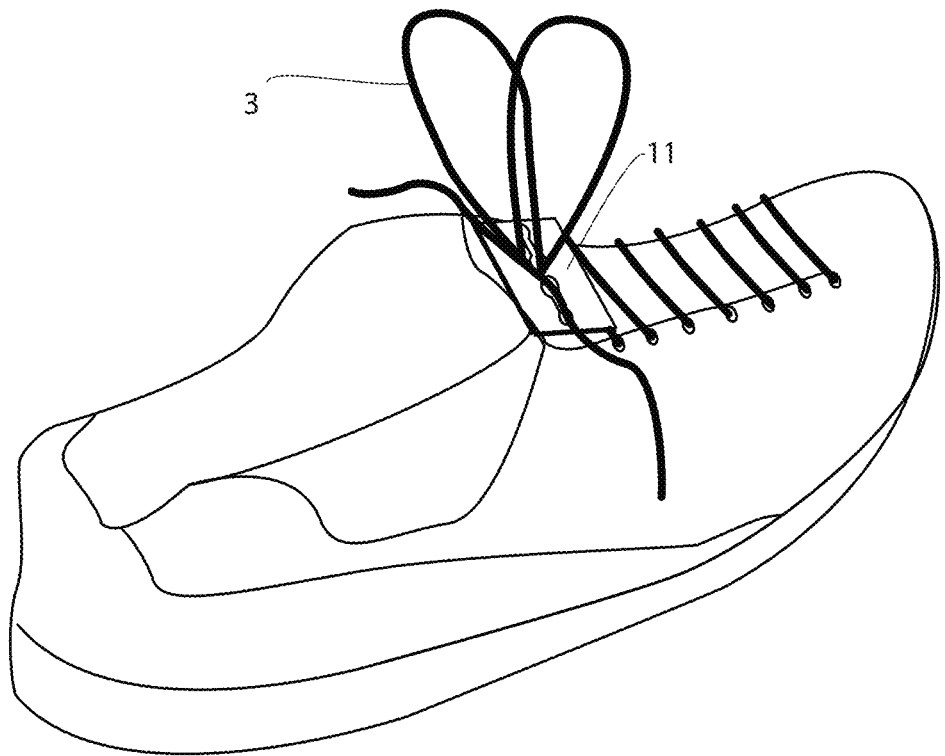
FIGS. 2a and 2b schematically show the device for assisting with tying laces disposed on a shoe.
Figure 2B:
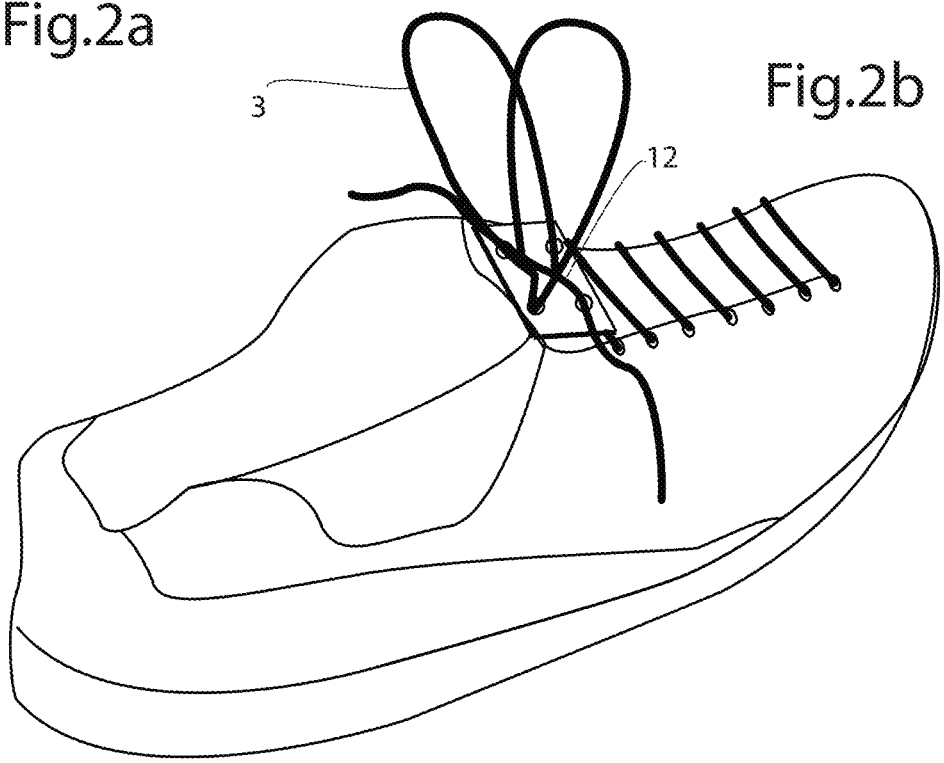

In FIGS. 1a and 1b, which are not to scale, there is shown a schematic view of an embodiment of the device for assisting with tying laces 3 comprising a first element 11 having at least two pairs of holes 12, 13, the holes of each pair being connected by a slot 14 represented in FIG. 1a, and a second element 21 having at least two pairs of square-shaped or aligned holes 22, 23, represented in FIGS. 1b and 1c and arranged so as to be superimposed on the first element 11. As could be seen, each pair of holes of the first element 12, 13 comprises a first hole 121, 131 with a size adapted to let a lace be displaced therein and a second hole 122, 132 with a size adapted to block any displacement of the lace.

Concomitantly, each pair of holes 22, 23 of the second element 21 comprises a first hole 221, 231 adapted to let said lace pass in a first direction, preferably outwards, that is to say from the shoe side towards the opposite side, and a second hole 222, 232 adapted to let the lace pass in a second direction opposite to the first direction, that is to say from the outside towards the shoe, so that the lace could form a loop on the device, that is to say, on the side of the device opposite to the shoe.

Preferably, the first and second elements 21, 22 are curved or straight planar elements having a size comprised between 2 and 10 cm in length, 2 and 5 cm in width and 1 and 5 mm in thickness, and are made of a material from the group including at least one amongst a metal, whether precious or not, a rigid, semi-rigid or flexible polymer, an organic compound, a ceramic material or the like.

Also, preferably, the first holes 121, 131 of the first element and the holes of the second element 221, 222, 231, 232 have a diameter comprised within the range from 3 mm to 8 mm, preferably 4 mm to 5 mm, ideally 4.5 mm, while the second holes 122, 132 of the first element have a diameter comprised within the range from 0.5 mm to 5 mm, preferably 2 mm to 3 mm, ideally 2.5 mm.

Similarly, the slots connecting the first 121, 131 and second 122, 132 holes of the first element 11 have a length comprised between 1 mm and 1 cm and a thickness comprised between 0.5 and 5 mm. Although not shown in FIG. 1a, the thickness of the slot 14 preferably decreases along its length between the first hole 121, 131 and the second hole 122, 132.

Similarly, although not shown in the figures, when the two elements 11, 12 are arranged so that when they are disposed one on top of the other, the first holes 121, 131 of the first element face the first holes of the second element 221, 231.

The invention also relates to a use of the above-described device comprising a method for assisting with tying laces, preferably on a shoe, comprising the steps consisting in applying the first element 11 on the shoe so as to make the laces 3 pass through the first holes 121, 131 of the first element 11 transversely with respect to the first element, adjusting the laces 3 in the tight position so as to minimize the length of the lace between the first holes 121, 131 and the shoe and displacing the laces from the first holes 121, 131 to the second holes 122, 132, parallel to the plane of the first element 11, via the respective slots 14 so as to block the laces in the tight position.

Next, the second element 21 should be applied to the first element 11 so as to make the laces 3 pass through first holes 221, 231 in a first outward direction, and then make the laces 3 pass through the second hole 222, 232 in a second direction opposite to the first direction so that said lace could form a loop on one side of the device opposite to the shoe.

Thus, the movement of the laces relative to the first element is a two-step movement, firstly transverse with respect to the plane of the first element 11 when they cross the hole and then parallel when they slip into the slots 14, while the movement relative to the second element 221 and doubly transverse thereto.

Although the embodiments have been described jointly with a number of embodiments, it is obvious that many variants, modifications and variations would or will be apparent to those skilled in the art. Consequently, this disclosure is intended to encompass all these alternatives, modifications, equivalents and variations which fall within the scope of this disclosure. This is particularly the case of the different arrangements and numbers of holes, shapes of said holes or of the usable elements.

The invention claimed is:

1. A device for assisting with tying laces comprising a first element having at least two pairs of holes, the holes of each pair being connected by a slot, and characterized in that each pair of holes of the first element comprises a first hole with a size adapted to let a lace pass therein and a second hole with a size adapted to block any displacement of said lace, and
    a second element having at least two pairs of holes and arranged so as to be superimposed on the first element, and each pair of holes of the second element comprises a first hole adapted to let said lace pass in a first direction and a second hole adapted to let said lace pass in a second direction opposite to the first direction so that said lace could form a loop on the device.

2. The device according to claim 1, characterized in that the first and second elements are curved or straight planar elements.

3. The device according to claim 1, characterized in that the first and second elements are made of a material from the group including at least one amongst a metal, whether precious or not, a rigid, semi-rigid or flexible polymer, an organic compound, a ceramic material or the like.

4. The device according to claim 1 characterized in that the first holes of the first element and the holes of the second element have a diameter comprised within the range from 3 mm to 8 mm.

5. The device according to claim 1, characterized in that the second holes of the first element have a diameter comprised within the range from 0.5 mm to 5 mm.

6. The device according to claim 1, characterized in that at least one amongst the first and second elements has a size comprised between 2 and 10 cm in length, 2 and 5 cm in width and 1 and 5 mm in thickness.

7. The device according to claim 1, characterized in that the slots connecting the first and second holes of the first element have a length comprised between 1 mm and 1 cm and a thickness comprised between 0.5 and 5 mm.

8. The device according to claim 1, characterized in that the thickness of the slot decreases along its length between the first hole and the second hole.

9. The device according to claim 1, characterized in that when the two elements are arranged so that when they are disposed one on top of the other, the first holes of the first element face the first holes of the second element.

10. The device according to claim 1, characterized in that the holes of the second element are aligned one next to the other according to a straight line.

11. A method for assisting with tying shoes, preferably on a shoe, comprising a use of the device for assisting with tying shoes according to claim 1, comprising the following steps:
- applying the first element on the shoe so as to make the laces pass through the first holes of the first element transversely with respect to the first element,
- adjusting the laces in the tight position so as to minimize the lace length between the first holes and the shoe and displace the laces from the first holes to the second holes parallel to the plane of the first element, via the respective slots so as to block the laces in the tight position,
- applying the second element on the first element so as to make the laces pass through first holes in a first outward direction, then make the laces pass through the second hole in a second direction opposite to the first direction so that said lace could form a loop on one side of the device opposite to the shoe.

12. The method according to claim 11, wherein the movement of the laces relative to the first element is a two-step movement, firstly transverse with respect to the plane of the first element when they pass through the hole and then parallel when they slip into the slots.

* * * * *